J. V. ROBINSON.
AUTOMATIC TRAIN PIPE CONNECTOR.
APPLICATION FILED MAR. 16, 1914. RENEWED SEPT. 13, 1917.
1,245,792.
Patented Nov. 6, 1917.
2 SHEETS—SHEET 1.
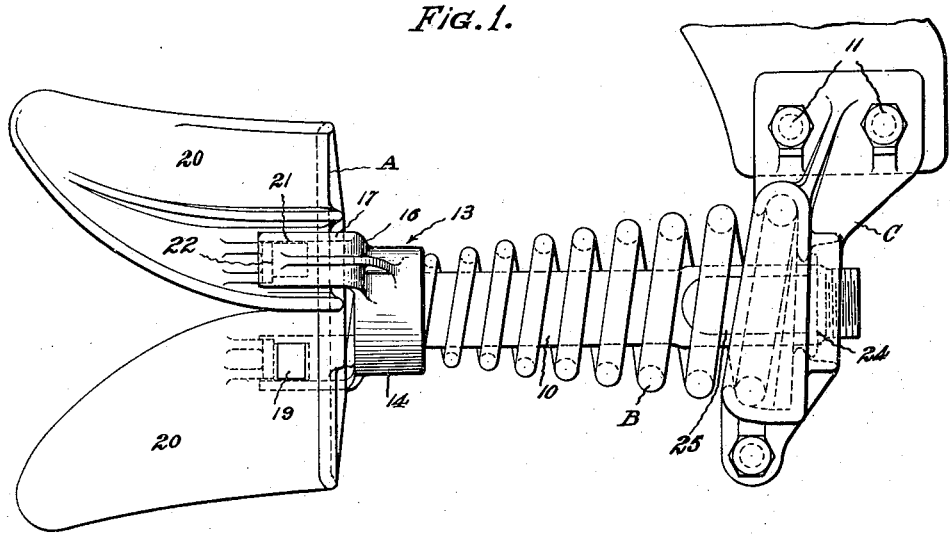
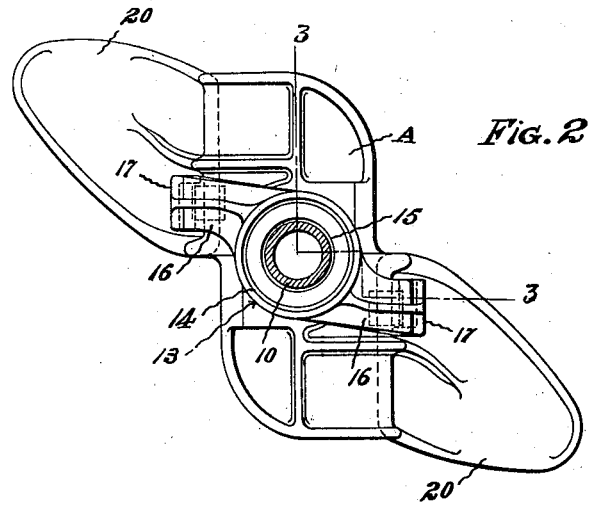

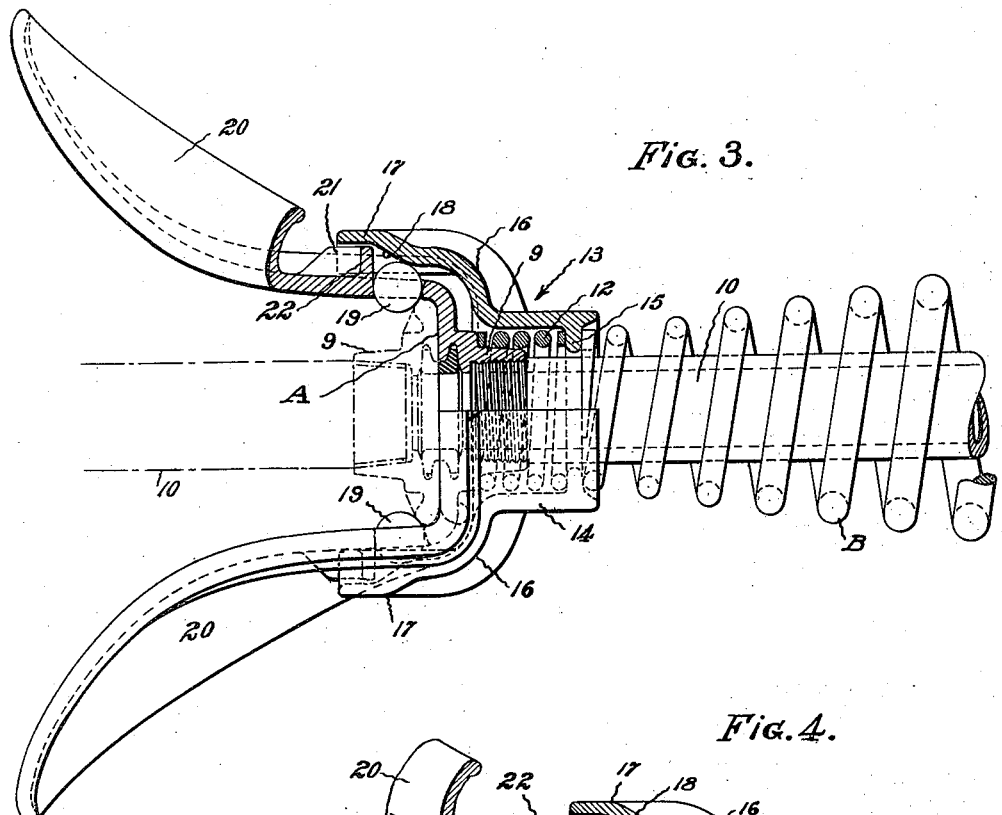
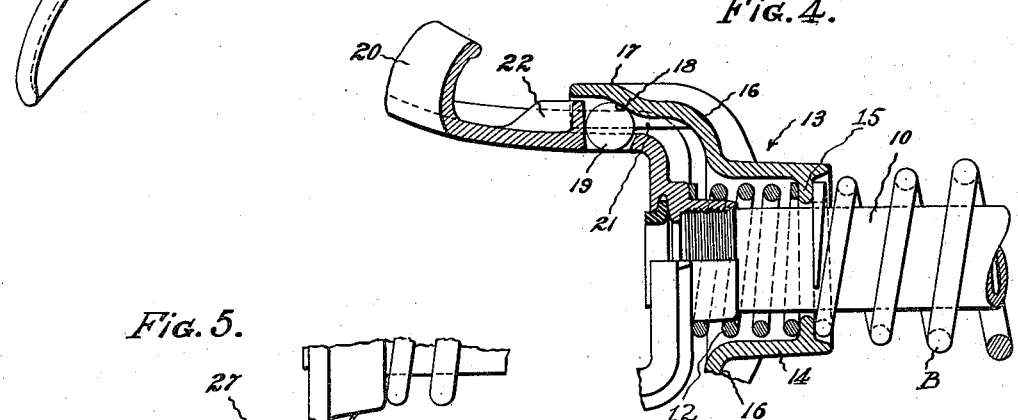
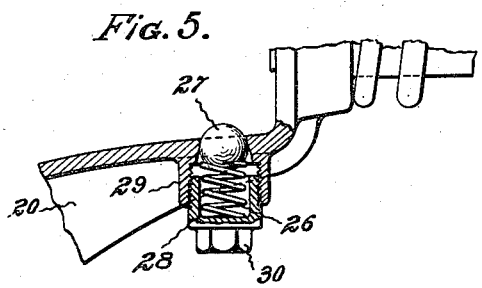

UNITED STATES PATENT OFFICE.

JOSEPH V. ROBINSON, OF BRANFORD, CONNECTICUT.

AUTOMATIC TRAIN-PIPE CONNECTOR.

1,245,792.   Specification of Letters Patent.   Patented Nov. 6, 1917.

Application filed March 16, 1914, Serial No. 825,004. Renewed September 13, 1917. Serial No. 191,311.

*To all whom it may concern:*

Be it known that I, JOSEPH V. ROBINSON, a citizen of the United States, and a resident of Branford, county of New Haven, State of Conn., have invented certain new and useful Improvements in Automatic Train-Pipe Connectors, of which the following is a specification.

This invention relates to automatic train pipe couplings for automatically connecting together the air and steam hose between railway cars and more particularly to that type of train pipe couplings having a lock for positively locking the coupling heads together. The object is to improve, to simplify the construction and to increase the efficiency of such locks and to that end the invention consists in the combinations, improvements and constructions hereinafter described, pointed out in the appended claims and illustrated in the accompanying drawings in which:

Figure 1, is a side elevation of my improvement,

Fig. 2, is a rear view of the coupling head showing the geenral outline of the locking device, Fig. 3, is a section on the line 3—3 of Fig. 2, showing my improved lock in the service position, Fig. 4, is a detail of the lock in the inoperative position, and Fig. 5, is a sectional elevation of a modification of my improved lock.

Referring to the drawings: I show a coupling head A of substantially rectangular outline and having a threaded shank 9 into which is screwed a pipe or stem 10. The head is yieldingly supported by a conical spring B which serves also to place the head under pressure and which is suitably secured to a base C, the base being in turn connected to the car as by bolts 11. These parts are of the same general construction as corresponding parts shown and described in my co-pending application Serial Number 773,560, filed June 13, 1913, except in the present construction the stem 10 does not extend through the head.

Upon the shank 9 and between the coupling head A and the supporting spring B, I mount an auxiliary spring 12 of less resistance than the supporting spring B, and between this auxiliary spring and the spring B I mount a spider or device 13 having a cylindrical portion 14 for receiving both of the said springs, and having also a shoulder 15 against which each of the springs abut. The spider surrounds the stem 10 and is loosely mounted thereon, so that it may move to angular positions relative to the head A.

Radially extending arms 16 are provided on the spider or device 13 and each of the arms has a projection 17 which embraces the sides of the coupling head A and which is provided with a tapered way 18. A cylindrical member or roller 19 of non-yieldable material is rotatably and movably mounted in an aperture of each of the guiding prongs 20 of the head A, such apertures being of sufficient diameter to permit the member to extend through the guides 20, but not to pass therethrough. To exclude dirt and other foreign substance from the aperture in which the member is mounted, I provide the projection 17 with webs 21 and the guides 20 with a boss 22 extending into the projection 17, as shown.

The operation of the coupler is as follows: When two of the couplings meet, the heads are guided into alinement by the guiding prongs 20, the supporting spring B yielding to permit of such alinement of the heads. Further lineal movement of the head compresses the auxiliary spring 12, permitting the heads to move rearwardly relative to the arms 16 and projections 17 until the tapered way 18 comes into engagement with the member 19 and forces it inwardly into tight engagement with the rear face of the mating coupling head. Continued movement compresses the supporting spring B the full force of which is transmitted through the arms 16 and the projections 17 to the member 19, shifting it into rigid engagement with the mating head, during which shifting the member travels in a plane parallel to the face of said coupling head. The parts are so proportioned as to leave space between the coupling head A and the arms 16 when in this position, so that the the arms and head may further shift relatively when necessary and force the member 19 inwardly to compensate for any wear upon the locking parts of either or both of the coupling heads.

In uncoupling, the reverse of this operation takes place. The supporting spring B reaches its free length first, whereupon the auxiliary spring 12 projects the coupling A forwardly of the arms 16 and projections 17, freeing the member 19 of the clamping pressure of the tapered way 18 and permitting the coupling heads to move from the locked position. During such movement of the heads and also during coupling movement thereof, the member 19 is shifted laterally by its engagement with the opposing head.

The locking parts are assembled by dropping the member into place before the projections 17 are extended forwardly over it and the head. It is to be observed that forward movement of the head relative to the projection 17 is limited by engagement of a collar 24 upon the rear end of the stem 10 with the rear face of the base C as shown, and that undue rotary movement of the head relative to the base C is prevented by flattening the stem 10 at 25 and mounting such flattened portion in an elongated opening in the base C, the stem being first rigidly mounted in the coupling head A. It will be further noted that rotary movement of the arms 16 relative to the head is prevented by engagement of the webs 21 with the boss 22 of the guides 20.

Fig. 5 illustrates a modification of my improved lock in which a spring 26 maintains a ball 27 in the locked position, instead of the arms and projections 16 and 17 respectively. The spring is confined within a sleeve 28 fitting a threaded socket in a boss 29 on the guide 20, as shown. The sleeve is provided with a hexagon head 30 for receiving a wrench to adjust it in the boss 29, to vary the force of the spring 26 on the ball 27.

This construction is adapted for use particularly with a support of the type shown in my co-pending application Serial Number 781,194, filed July 25, 1913, by which the resistance to lateral movement of the coupling head A when coupled is minimized. With this form of support the sharp whipping movement of running cars is practically the only cause of angular movement between the faces of coupled heads and this modified form of my improved lock will effectively prevent such movement and insure a tight joint at all times. It will be obvious that the ball 27 may be substituted for the member 19 and used in the preferred form of my invention.

Having thus described my said invention, what I claim as new and desire to secure by United States Letters Patent is:

1. In an automatic train pipe coupling, the combination of a coupling head provided with a guide, a member supported by and movable relatively to the head, and a lock arranged within said member and adapted to be engaged with a companion head by relative movement between said member and its supporting head during a coupling operation.

2. In an automatic train pipe coupling, the combination of a coupling head provided with a guide, a member supported by and movable relatively to the head, a spring adapted to place the head under pressure, and a lock arranged within said member and adapted to be positively moved into engagement with a companion head by relative movement between said member and its supporting head during a coupling operation and to be retained in locking position by said spring.

3. In an automatic train pipe coupling, the combination of a coupling head, a spring for placing the head under pressure, a cylindrical member for locking said head to a companion head, and means for transmitting to said member the full force of said spring when the latter is in the coupled position, whereby said member and spring cooperate to draw said companion head into tight engagement with said coupling head.

4. In an automatic train pipe coupling, the combination of a coupling head provided with a guide, a bodily movable locking member carried by the head and adapted to engage a companion head, and means supported by the head and movable relative thereto for positively adjusting said member in operative position as two heads are coupled and maintaining it in said position.

5. In an automatic train pipe coupling, the combination of a coupling head provided with a guide, a bodily movable locking member carried by the guide and adapted to engage a companion head, and a cam surface movable longitudinally of the guide and acting directly upon said member to move it into operative position as said heads are coupled.

6. In an automatic train pipe coupling, the combination of a coupling head, and a lock for locking said head to a companion head, said lock comprising a member having a round face and mounted on a portion of said coupling head and extending therethrough and adapted to shift laterally of the coupling head in a plane parallel to the face of such head when the heads couple up in service.

7. In an automatic train pipe coupling, the combination of a coupling head, a lock for locking said head to a companion head, said lock comprising a member mounted on a portion of said coupling head and extending therethrough and adapted to shift laterally of the coupling head in a plane parallel to the face thereof as the heads couple and uncouple in service, and means for positively locking said member against such movement while the heads are in the service position.

8. In an automatic train pipe coupling, the combination of a coupling head, a lock for locking said head to a companion head, said lock comprising a member mounted in a portion of said coupling head and adapted to shift relative to said head in a lateral direction only, a stem extending rearwardly of the head, and a device movably mounted on said stem and provided with a projection for engaging said member to lock the same against undue movement while the heads are coupled up in service.

9. In an automatic train pipe coupling, the combination of a coupling head, a lock for locking said head to a companion head, said lock comprising a cylindrical member mounted on a portion of said coupling head, a stem extending from the coupling head, and a spider movably mounted on said stem having arms embracing a portion of said coupling head and engaging said member to lock the latter against undue movement when said coupling head and companion head are coupled up in service.

10. In an automatic train pipe coupling, the combination of a coupling head, a lock for locking said head to a companion head, and arms embracing a portion of said coupling head and having a tapered way for riding on said lock to shift the latter into the service position relative to said companion head.

11. In an automatic train pipe coupling, the combination of a coupling head, a lock for locking said head to a companion head, comprising a member mounted in the head and movable transversely to engage a companion head, a stem extending rearwardly of the coupling head, a spring surrounding said stem, a device interposed between said spring and said coupling head and provided with a tapered surface adapted to directly engage the outer face of said locking member and force it into the service position, and a spring between said device and coupling head for shifting the device from the service position when the heads uncouple in service.

In testimony whereof, I have hereunto set my hand in the presence of two witnesses.

JOSEPH V. ROBINSON.

In the presence of—
   Arthur L. Bryant,
   S. C. McBride.

Copies of this patent may be obtained for five cents each, by addressing the "Commissioner of Patents, Washington, D. C."